US 008073810B2

(12) United States Patent
Maes (10) Patent No.: US 8,073,810 B2
(45) Date of Patent: Dec. 6, 2011

(54) SHARED VIEW OF CUSTOMERS ACROSS BUSINESS SUPPORT SYSTEMS (BSS) AND A SERVICE DELIVERY PLATFORM (SDP)

(75) Inventor: Stephane Maes, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 391 days.

(21) Appl. No.: 11/926,738

(22) Filed: Oct. 29, 2007

(65) Prior Publication Data
US 2009/0112875 A1    Apr. 30, 2009

(51) Int. Cl.
*G06F 17/00*    (2006.01)

(52) U.S. Cl. ........................................ 707/602; 707/600

(58) Field of Classification Search ................... 707/10, 707/600, 602
See application file for complete search history.

(56) References Cited

U.S. PATENT DOCUMENTS

| | | |
|---|---|---|
| 5,414,812 A | 5/1995 | Filip et al. |
| 5,699,513 A | 12/1997 | Feigen et al. |
| 5,786,770 A | 7/1998 | Thompson |
| 5,850,517 A | 12/1998 | Verkler et al. |
| 5,867,665 A | 2/1999 | Butman et al. |
| 6,115,690 A | 9/2000 | Wong |
| 6,119,104 A | 9/2000 | Brumbelow |
| 6,128,645 A | 10/2000 | Butman et al. |
| 6,157,941 A | 12/2000 | Verkler et al. |
| 6,163,800 A | 12/2000 | Ejiri |
| 6,230,271 B1 | 5/2001 | Wadlow et al. |
| 6,272,556 B1 | 8/2001 | Gish |
| 6,275,857 B1 | 8/2001 | McCartney |
| 6,336,138 B1 | 1/2002 | Caswell et al. |
| 6,374,305 B1 | 4/2002 | Gupta et al. |
| 6,466,984 B1 | 10/2002 | Naveh et al. |
| 6,496,864 B1 | 12/2002 | McCartney |
| 6,578,159 B1 | 6/2003 | Kitagawa et al. |

(Continued)

FOREIGN PATENT DOCUMENTS
EP      2 034 748 A1    3/2009

OTHER PUBLICATIONS

U.S. Appl. No. 11/848,347, filed Aug. 31, 2007, Office Action mailed Oct. 29, 2009, 12 pages.

(Continued)

*Primary Examiner* — Rehana Perveen
*Assistant Examiner* — Tiffany Thuy Bui
(74) *Attorney, Agent, or Firm* — Kilpatrick Townsend & Stockton LLP (57) ABSTRACT

An identity management tool provides identity management across multiple domains, providing a single access point not only for information for runtime, network, and service layer information, but also for systems such as business support systems (BSS), operational support systems (OSS), and third party systems. The identity management tool creates a unified user profile that maps customer identities across the various domains, and presents the information in a virtual directory wherein the information appears to come from a single source, creating a central data hub for the various systems. This aggregation provides for the same experience and service across various access networks and using various channels. Such an architecture allows billing and service information to be shared with subscription and customer information, even though the data is substantially unrelated data from disparate data sources, without the need to combine schemas or aggregate the data into a single data store.

19 Claims, 6 Drawing Sheets

U.S. PATENT DOCUMENTS

| | | |
|---|---|---|
| 6,611,812 B2 | 8/2003 | Hurtado et al. |
| 6,748,570 B1 | 6/2004 | Bahrs et al. |
| 6,792,605 B1 | 9/2004 | Roberts et al. |
| 6,868,413 B1 | 3/2005 | Grindrod et al. |
| 6,978,348 B2 | 12/2005 | Belknap et al. |
| 6,985,939 B2 | 1/2006 | Fletcher et al. |
| 7,003,578 B2 | 2/2006 | Kanada et al. |
| 7,042,988 B2 | 5/2006 | Juitt et al. |
| 7,043,538 B2 | 5/2006 | Guedalia et al. |
| 7,111,060 B2 | 9/2006 | Araujo et al. |
| 7,114,146 B2 | 9/2006 | Zhang et al. |
| 7,114,148 B2 | 9/2006 | Irving et al. |
| 7,143,094 B2 * | 11/2006 | Arroyo et al. ............ 707/999.01 |
| 7,146,616 B2 | 12/2006 | Dorner et al. |
| 7,185,342 B1 | 2/2007 | Carrer et al. |
| 7,194,482 B2 | 3/2007 | Larkin et al. |
| 7,222,334 B2 | 5/2007 | Casati et al. |
| 7,272,625 B1 | 9/2007 | Hannel et al. |
| 7,340,508 B1 | 3/2008 | Kasi et al. |
| 7,409,707 B2 | 8/2008 | Swander et al. |
| 7,411,943 B2 | 8/2008 | Kittredge et al. |
| 7,415,010 B1 | 8/2008 | Croak et al. |
| 7,433,838 B2 | 10/2008 | Welsh et al. |
| 7,447,793 B2 | 11/2008 | Morioka |
| 7,454,399 B2 | 11/2008 | Matichuk |
| 7,461,062 B2 | 12/2008 | Stewart et al. |
| 7,472,349 B1 | 12/2008 | Srivastava et al. |
| 7,519,076 B2 | 4/2009 | Janssen et al. |
| 7,580,994 B1 | 8/2009 | Fiszman et al. |
| 7,617,521 B2 | 11/2009 | Maes |
| 7,630,953 B2 | 12/2009 | Stauber et al. |
| 7,676,813 B2 * | 3/2010 | Bisset et al. ................. 719/318 |
| 7,716,310 B2 | 5/2010 | Foti |
| 7,752,634 B1 | 7/2010 | Saxena et al. |
| 7,853,647 B2 | 12/2010 | Maes |
| 7,860,490 B2 | 12/2010 | Maes |
| 7,873,716 B2 | 1/2011 | Maes |
| 2002/0087674 A1 | 7/2002 | Guilford et al. |
| 2002/0099738 A1 | 7/2002 | Grant |
| 2002/0101879 A1 | 8/2002 | Bouret |
| 2002/0111848 A1 | 8/2002 | White |
| 2002/0143819 A1 | 10/2002 | Han et al. |
| 2002/0144119 A1 | 10/2002 | Benantar |
| 2002/0178122 A1 | 11/2002 | Maes |
| 2002/0184373 A1 | 12/2002 | Maes |
| 2002/0191774 A1 | 12/2002 | Creamer et al. |
| 2002/0194388 A1 | 12/2002 | Boloker et al. |
| 2002/0198719 A1 | 12/2002 | Gergic et al. |
| 2002/0198991 A1 | 12/2002 | Gopalakrishnan et al. |
| 2003/0003953 A1 | 1/2003 | Houplain |
| 2003/0023953 A1 | 1/2003 | Lucassen et al. |
| 2003/0046316 A1 | 3/2003 | Gergic et al. |
| 2003/0061268 A1 | 3/2003 | Moerdijk et al. |
| 2003/0061404 A1 | 3/2003 | Atwal et al. |
| 2003/0115203 A1 | 6/2003 | Brown et al. |
| 2003/0115260 A1 | 6/2003 | Edge |
| 2003/0131076 A1 | 7/2003 | Nelson et al. |
| 2003/0154233 A1 | 8/2003 | Patterson |
| 2003/0191769 A1 | 10/2003 | Crisan et al. |
| 2003/0208539 A1 | 11/2003 | Gildenblat et al. |
| 2003/0217044 A1 | 11/2003 | Zhang et al. |
| 2003/0229812 A1 | 12/2003 | Buchholz |
| 2004/0015547 A1 | 1/2004 | Griffin et al. |
| 2004/0015578 A1 | 1/2004 | Karakashian et al. |
| 2004/0024720 A1 | 2/2004 | Fairweather |
| 2004/0064528 A1 | 4/2004 | Meredith et al. |
| 2004/0068586 A1 | 4/2004 | Xie et al. |
| 2004/0110493 A1 | 6/2004 | Alvarez et al. |
| 2004/0128546 A1 | 7/2004 | Blakley et al. |
| 2004/0139319 A1 | 7/2004 | Favazza et al. |
| 2004/0161090 A1 | 8/2004 | Digate et al. |
| 2004/0176988 A1 | 9/2004 | Boughannam |
| 2004/0221005 A1 | 11/2004 | Albaugh et al. |
| 2005/0015340 A1 | 1/2005 | Maes |
| 2005/0021670 A1 | 1/2005 | Maes |
| 2005/0054287 A1 | 3/2005 | Kim |
| 2005/0073982 A1 * | 4/2005 | Corneille et al. ............ 370/338 |
| 2005/0075115 A1 * | 4/2005 | Corneille et al. ........... 455/456.3 |
| 2005/0086197 A1 | 4/2005 | Boubez et al. |
| 2005/0086297 A1 | 4/2005 | Hinks |
| 2005/0091156 A1 * | 4/2005 | Hailwood et al. ................ 705/40 |
| 2005/0125696 A1 | 6/2005 | Afshar et al. |
| 2005/0132086 A1 | 6/2005 | Flurry et al. |
| 2005/0193269 A1 * | 9/2005 | Haswell et al. ................. 714/38 |
| 2005/0228984 A1 | 10/2005 | Edery et al. |
| 2005/0239485 A1 | 10/2005 | Kundu et al. |
| 2005/0249190 A1 | 11/2005 | Birch |
| 2005/0249344 A1 | 11/2005 | Mueller et al. |
| 2005/0267979 A1 | 12/2005 | Bailey |
| 2006/0014688 A1 | 1/2006 | Costa et al. |
| 2006/0041669 A1 | 2/2006 | Bemmel et al. |
| 2006/0080117 A1 | 4/2006 | Carr et al. |
| 2006/0116912 A1 | 6/2006 | Maes |
| 2006/0117109 A1 | 6/2006 | Maes |
| 2006/0143686 A1 | 6/2006 | Maes |
| 2006/0164902 A1 | 7/2006 | Fung |
| 2006/0165060 A1 | 7/2006 | Dua |
| 2006/0178898 A1 | 8/2006 | Habibi |
| 2006/0190600 A1 | 8/2006 | Blohm et al. |
| 2006/0212574 A1 | 9/2006 | Maes |
| 2006/0256774 A1 | 11/2006 | Rigaldies et al. |
| 2006/0272028 A1 | 11/2006 | Maes |
| 2006/0282856 A1 | 12/2006 | Errico et al. |
| 2006/0291507 A1 | 12/2006 | Sarosi et al. |
| 2007/0005770 A1 | 1/2007 | Kramer et al. |
| 2007/0011191 A1 | 1/2007 | Otokawa et al. |
| 2007/0011322 A1 | 1/2007 | Moiso |
| 2007/0061397 A1 * | 3/2007 | Gregorat et al. .............. 709/203 |
| 2007/0100831 A1 | 5/2007 | Cox |
| 2007/0100981 A1 | 5/2007 | Adamczyk et al. |
| 2007/0112574 A1 | 5/2007 | Greene |
| 2007/0118618 A1 | 5/2007 | Kisel et al. |
| 2007/0150480 A1 * | 6/2007 | Hwang et al. ................... 707/10 |
| 2007/0150936 A1 | 6/2007 | Maes |
| 2007/0201376 A1 | 8/2007 | Marshall-Wilson |
| 2007/0203841 A1 | 8/2007 | Maes |
| 2007/0204017 A1 | 8/2007 | Maes |
| 2007/0233883 A1 | 10/2007 | De Lutiis et al. |
| 2007/0239866 A1 | 10/2007 | Cox et al. |
| 2007/0271554 A1 | 11/2007 | Fletcher et al. |
| 2007/0276907 A1 | 11/2007 | Maes |
| 2007/0280226 A1 | 12/2007 | Sonalkar et al. |
| 2007/0291859 A1 | 12/2007 | Maes |
| 2008/0013533 A1 | 1/2008 | Bogineni et al. |
| 2008/0025243 A1 * | 1/2008 | Corneille et al. .............. 370/313 |
| 2008/0080479 A1 | 4/2008 | Maes |
| 2008/0109853 A1 | 5/2008 | Einarsson et al. |
| 2008/0151918 A1 | 6/2008 | Foti |
| 2008/0162637 A1 | 7/2008 | Adamczyk et al. |
| 2008/0168523 A1 | 7/2008 | Ansari et al. |
| 2008/0186845 A1 | 8/2008 | Maes |
| 2008/0189401 A1 | 8/2008 | Maes |
| 2008/0228919 A1 | 9/2008 | Doshi et al. |
| 2008/0232567 A1 | 9/2008 | Maes |
| 2008/0235230 A1 | 9/2008 | Maes |
| 2008/0235327 A1 | 9/2008 | Maes et al. |
| 2008/0235354 A1 | 9/2008 | Maes |
| 2008/0235380 A1 | 9/2008 | Maes |
| 2008/0275883 A1 | 11/2008 | Ashraf et al. |
| 2008/0288966 A1 | 11/2008 | Maes |
| 2008/0301135 A1 | 12/2008 | Alves et al. |
| 2008/0307108 A1 | 12/2008 | Yan et al. |
| 2009/0006360 A1 | 1/2009 | Liao et al. |
| 2009/0015433 A1 | 1/2009 | James et al. |
| 2009/0034426 A1 | 2/2009 | Luft et al. |
| 2009/0119303 A1 | 5/2009 | Rio et al. |
| 2009/0125595 A1 | 5/2009 | Maes |
| 2009/0132717 A1 | 5/2009 | Maes |
| 2009/0187919 A1 | 7/2009 | Maes |
| 2009/0193057 A1 | 7/2009 | Maes |
| 2009/0193433 A1 | 7/2009 | Maes |
| 2009/0201917 A1 | 8/2009 | Maes et al. |
| 2009/0228584 A1 | 9/2009 | Maes et al. |
| 2009/0306834 A1 | 12/2009 | Hjelm et al. |
| 2009/0328051 A1 | 12/2009 | Maes |
| 2010/0049640 A1 | 2/2010 | Maes |
| 2010/0049826 A1 | 2/2010 | Maes |

| | | |
|---|---|---|
| 2010/0058436 A1 | 3/2010 | Maes |
| 2010/0077082 A1 | 3/2010 | Hession et al. |
| 2011/0125909 A1 | 5/2011 | Maes |
| 2011/0125913 A1 | 5/2011 | Maes |
| 2011/0126261 A1 | 5/2011 | Maes |
| 2011/0134804 A1 | 6/2011 | Maes |

OTHER PUBLICATIONS

U.S. Appl. No. 11/951,500, filed Dec. 6, 2007, Office Action mailed Sep. 22, 2009, 24 pages.
U.S. Appl. No. 11/951,500, filed Dec. 6, 2007, Final Office Action mailed Mar. 30, 2010, 26 pages.
U.S. Appl. No. 11/877,129, filed Oct. 23, 2007, Office Action mailed Sep. 28, 2009, 15 pages.
U.S. Appl. No. 11/877,129, filed Oct. 23, 2007, Final Office Action mailed Mar. 29, 2010, 17 pages.
U.S. Appl. No. 11/943,101, filed Nov. 20, 2007, Office Action mailed Jul. 8, 2009, 9 pages.
U.S. Appl. No. 11/943,101, filed Nov. 20, 2007, Final Office Action mailed Feb. 2, 2010, 9 pages.
U.S. Appl. No. 11/943,101, filed Nov. 20, 2007, Advisory Action mailed Apr. 16, 2010, 3 pages.
U.S. Appl. No. 12/019,299, filed Jan. 24, 2008, Office Action mailed Mar. 31, 2010, 13 pages.
International Search Report and Written Opinion of PCT/US2010/037074 mailed Jun. 1, 2011, 16 pages.
U.S. Appl. No. 11/848,347, filed Aug. 31, 2007, Final Office Action mailed Mar. 7, 2011, 21 pages.
U.S. Appl. No. 11/848,347, filed Aug. 31, 2007, Advisory Action mailed May 23, 2011, 3 pages.
U.S. Appl. No. 11/943,101, filed Nov. 20, 2007, Final Office Action mailed Feb. 14, 2011, 11 pages.
U.S. Appl. No. 11/943,101, filed Nov. 20, 2007, Advisory Action mailed Apr. 28, 2011, 3 pages.
U.S. Appl. No. 11/951,500, filed Dec. 6, 2007, Final Office Action mailed Apr. 14, 2011, 33 pages.
U.S. Appl. No. 10/855,999, filed May 28, 2004, Advisory Action dated Mar. 16, 2011, 3 pages.
U.S. Appl. No. 11/024,160, filed Dec. 27, 2004, Office Action dated Feb. 7, 2011, 11 pages.
U.S. Appl. No. 11/024,160, filed Dec. 27, 2004, Final Office Action dated Jun. 1, 2011, 11 pages.
U.S. Appl. No. 11/939,705, filed Nov. 14, 2007, Final Office Action mailed Mar. 17, 2011, 21 pages.
U.S. Appl. No. 12/019,335, filed Jan. 24, 2008, Office Action mailed May 23, 2011, 18 pages.
U.S. Appl. No. 12/544,459, filed Aug. 20, 2009, Office Action mailed Mar. 2, 2011, 10 pages.
U.S. Appl. No. 12/544,484, filed Aug. 20, 2009, Office Action dated Jun. 3, 2011, 6 pages.
U.S. Appl. No. 11/969,343, filed Jan. 4, 2008, Office Action mailed Jun. 10, 2011, 13 pages.
Maretzke, Michael, "JAIN SLEE Technology Overview", <http://www.maretzke.de/pub/lectures/jslee_overview_2005/JSLEE_Overview_2005.pdf>, Apr. 12, 2005, 26 pages.
O'Doherty, Phelim, "JSLEE—SIP Servlet", <http://java.sun.com/products/jain/JSLEE-SIPServlet.pdf, 2003, 13 pages.
The Parlay Group, "Specifications", <http://web.archive.org/web/20050114014707/www.parlay.org/specs/index.asp>, Jan. 14, 2005, 2 pages.
U.S. Appl. No. 12/019,299, filed Jan. 24, 2008, Advisory Action dated Dec. 9, 2010, 3 pages.
U.S. Appl. No. 12/019,299, filed Jan. 24, 2008, Office Action mailed Jan. 24, 2011, 16 pages.
U.S. Appl. No. 10/855,999, filed May 28, 2004, Final Office Action dated Jan. 5, 2011, 19 pages.
U.S. Appl. No. 11/123,468, filed May 5, 2005, Final Office Action dated Nov. 10, 2010, 18 pages.
U.S. Appl. No. 11/123,468, filed May 5, 2005, Advisory Action dated Jan. 18, 2011, 2 pages.
U.S. Appl. No. 12/364,642, filed Feb. 3, 2009, Office Action dated Dec. 20, 2010, 18 pages.

U.S. Appl. No. 11/357,653, filed Feb. 16, 2006, Office Action dated Jan. 20, 2011, 18 pages.
Wikipedia, "Parlay", <http://web.archive.org/web/20050130172632/en.wikipedia.org/wiki/Parlay>, Jan. 30, 2005, 3 pages.
Wikipedia, "Object-Oriented Programming", <http://web.archive.org/web/20051211141918/http://en.wikipedia.org/wiki/Object-oriented_programming>, Dec. 11, 2005, 10 pages.
Wikipedia, "OSI model", <http://web.archive.org/web/20050907132012/http://en.wikipedia.org/wiki/Osi_model>, Sep. 7, 2005, 8 pages.
U.S. Appl. No. 11/024,160, filed Dec. 27, 2004, Maes.
Andrews, Tony et al, Business Process Execution Language for Web Services, Version 1.1, BEA Systems, International Business Machines Corporation, SAP AG, Siebel Systems, May 5, 2003, 31 pages.
Burger, E. et al., "Deploying CCXML for Application-Layer Call Control," Aug. 2006, 11 pages.
Kim et al., "Implementation of Third Party Based Call Control using Parlay Network API in SIP Environment," ICOIN 2003, LNCS 2662, 2003, pp. 416-425.
Liberty Architecture Overview, Liberty Alliance Project Version 1.1, Piscataway New Jersey, Jan. 15, 2003, 44 pages.
Maes, Stephanie, Multi-modal Browser Architecture. Overview on the support of multi-modal browsers in 3GPP, IBM Research Mobile Speech Solutions and Conversational Multi-modal Computing, downloaded http://www.w3.org on May 26, 2003, 25 pages.
Maes, Stephanie, Multi-modal Web IBM Position W3C/WAP Workshop, IBM Research Human Language Technologies, downloaded http://www.w3.org on May 26, 2003, 9 pages.
Parlay APIs 4.0, Parlay X Web Services White Paper, The Parlay Group, Parlay X Working Group, Dec. 16, 2002, 12 pages.
Policy-Based Management Tom Sheldon's Linktionary, downloaded http://www.linktionary.com/policy.html on Aug. 2, 2004, 4 pages.
Romellini, C. et al., "CCXML: The Power of Standardization," Loquendo, Sep. 27, 2005.
Seely, Scott, "XML and Web Services Security: Understanding WS-Security", Microsoft Corporation, 2002.
Simpson et al, Java Product Review—Oracle EDA Suite, Dec. 4, 2006, Open Source Magazine, pp. 1-10.
Single Sign on Deployment Guide, Introduction to Single-Sign-On, Netscape 6 Documentation Training Manual http://developer.netscape.com/docs/manuals/security/SSO/sso.htm on May 26, 2003, 5 pages.
Sundsted, Todd E., with Liberty and single sign-on for all, The Liberty Alliance Project seeks to solve the current online identity crisis Java World, downloaded www.javaworld.com/javaworld/jw-02-2002/jw-0215-liberty.html on May 26, 2003, 7 pages.
Thomas Manes, Anne, "Registering a Web Service in UDDI", 2003.
U.S. Appl. No. 11/848,347, filed Aug. 31, 2007, Advisory Action mailed Jul. 27, 2010, 6 pages.
U.S. Appl. No. 11/848,347, filed Aug. 31, 2007, Final Office Action mailed May 10, 2010, 15 pages.
U.S. Appl. No. 11/848,347, filed Aug. 31, 2007, Office Action mailed Sep. 30, 2010, 19 pages.
U.S. Appl. No. 11/877,129, filed Oct. 23, 2007, Advisory Action mailed Jun. 3, 2010, 2 pages.
U.S. Appl. No. 11/877,129, filed Oct. 23, 2007, Notice of Allowance mailed Aug. 5, 2010, 6 pages.
U.S. Appl. No. 11/943,101, filed Nov. 20, 2007, Office Action mailed Aug. 27, 2010, 11 pages.
U.S. Appl. No. 11/951,500, filed Dec. 6, 2007, Advisory Action mailed Jun. 24, 2010, 2 pages.
U.S. Appl. No. 11/951,500, filed Dec. 6, 2007, Office Action mailed Sep. 1, 2010, 30 pages.
U.S. Appl. No. 12/019,299, filed Jan. 24, 2008, Final Office Action mailed Oct. 6, 2010, 20 pages.
U.S. Appl. No. 10/855,999, filed May 28, 2004, Advisory Action dated Feb. 16, 2010, 3 pages.
U.S. Appl. No. 10/855,999, filed May 28, 2004, Advisory Action dated Feb. 2, 2009, 3 pages.
U.S. Appl. No. 10/855,999, filed May 28, 2004, Final Office Action dated Nov. 19, 2008, 12 pages.

U.S. Appl. No. 10/855,999, filed May 28, 2004, Final Office Action dated Nov. 23, 2009, 19 pages.
U.S. Appl. No. 10/855,999, filed May 28, 2004, Office Action dated Apr. 15, 2009, 13 pages.
U.S. Appl. No. 10/855,999, filed May 28, 2004, Office Action dated May 1, 2008, 9 pages.
U.S. Appl. No. 10/855,999, filed May 28, 2004, Office Action dated Jun. 24, 2010, 20 pages.
U.S. Appl. No. 10/856,588, filed May 28, 2004, Advisory Action dated Jan. 5, 2010, 3 pages.
U.S. Appl. No. 10/856,588, filed May 28, 2004, Final Office Action dated Oct. 15, 2008, 11 pages.
U.S. Appl. No. 10/856,588, filed May 28, 2004, Final Office Action dated Oct. 20, 2009, 17 pages.
U.S. Appl. No. 10/856,588, filed May 28, 2004, Notice of Allowance dated Sep. 23, 2010, 8 pages.
U.S. Appl. No. 10/856,588, filed May 28, 2004, Office Action dated Mar. 16, 2009, 10 pages.
U.S. Appl. No. 10/856,588, filed May 28, 2004, Office Action dated Apr. 11, 2008, 16 pages.
U.S. Appl. No. 11/024,160, filed Dec. 27, 2004, Advisory Action dated Feb. 18, 2010, 3 pages.
U.S. Appl. No. 11/024,160, filed Dec. 27, 2004, Final Office Action dated Oct. 15, 2010, 11 pages.
U.S. Appl. No. 11/024,160, filed Dec. 27, 2004, Final Office Action dated Dec. 3, 2009, 11 pages.
U.S. Appl. No. 11/024,160, filed Dec. 27, 2004, Final Office Action dated Feb. 11, 2009, 9 pages.
U.S. Appl. No. 11/024,160, filed Dec. 27, 2004, Office Action dated Jun. 29, 2009, 9 pages.
U.S. Appl. No. 11/024,160, filed Dec. 27, 2004, Office Action dated Jun. 9, 2010, 10 pages.
U.S. Appl. No. 11/024,160, filed Dec. 27, 2004, Office Action dated Aug. 22, 2008, 8 pages.
U.S. Appl. No. 11/070,317, filed Mar. 1, 2005, Advisory Action dated 19, 2009, 3 pages.
U.S. Appl. No. 11/070,317, filed Mar. 1, 2005, Final Office Action dated Feb. 2, 2010, 8 pages.
U.S. Appl. No. 11/070,317, filed Mar. 1, 2005, Final Office Action dated Mar. 4, 2009, 16 pages.
U.S. Appl. No. 11/070,317, filed Mar. 1, 2005, Final Office Action dated Sep. 27, 2010, 8 pages.
U.S. Appl. No. 11/070,317, filed Mar. 1, 2005, Office Action dated Apr. 30, 2010, 9 pages.
U.S. Appl. No. 11/070,317, filed Mar. 1, 2005, Office Action dated Aug. 18, 2009, 21 pages.
U.S. Appl. No. 11/070,317, filed Mar. 1, 2005, Office Action dated Aug. 5, 2008, 18 pages.
U.S. Appl. No. 11/123,468, filed May 5, 2005, Advisory Action dated Feb. 17, 2010, 3 pages.
U.S. Appl. No. 11/123,468, filed May 5, 2005, Final Office Action dated Nov. 24, 2009, 19 pages.
U.S. Appl. No. 11/123,468, filed May 5, 2005, Office Action dated Apr. 10, 2009, 17 pages.
U.S. Appl. No. 11/123,468, filed May 5, 2005, Office Action dated Apr. 14, 2010, 16 pages.
U.S. Appl. No. 11/123,471, filed May 5, 2005, Notice of Allowance dated Jun. 29, 2009, 6 pages.
U.S. Appl. No. 11/123,471, filed May 5, 2005, Office Action dated Jan. 23, 2009, 8 pages.
U.S. Appl. No. 11/130,636, filed May 16, 2005, Notice of Allowance mailed Aug. 18, 2010, 4 pages.
U.S. Appl. No. 11/130,636, filed May 16, 2005, Office Action dated Mar. 23, 2010, 6 pages.
U.S. Appl. No. 11/130,636, filed May 16, 2005, Office Action dated Sep. 18, 2009, 13 pages.
U.S. Appl. No. 11/939,705, filed Nov. 14, 2007, Office Action mailed Oct. 4, 2010, 21 pages.
U.S. Appl. No. 12/045,220, filed Mar. 10, 2008, Advisory Action dated Jun. 11, 2010, 3 pages.
U.S. Appl. No. 12/045,220, filed Mar. 10, 2008, Final Office Action dated Apr. 2, 2010, 19 pages.
U.S. Appl. No. 12/045,220, filed Mar. 10, 2008, Office Action dated Oct. 2, 2009, 18 pages.

* cited by examiner

- Prior Art -

SHARED VIEW OF CUSTOMERS ACROSS BUSINESS SUPPORT SYSTEMS (BSS) AND A SERVICE DELIVERY PLATFORM (SDP)

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates generally to the management of data across a domain, an in particular to providing a common view and access point for customer information across multiple disparate data sources.

As an ever increasing number of services is being offered by various network providers, there is a corresponding increase in the number of systems, devices, applications, and components that utilize and store data for customers. While some of these data sources contain related data that can be easily aggregated or combined into a common schema, there are many sources that contain data that is considered to be substantially unrelated, or not easily aggregated, such that the data is not typically able to be accessed in a common fashion or point of entry. Further, companies may not wish to spend the time and money to generate common schemas or data repositories that are used across an entire domain.

Figure 1:
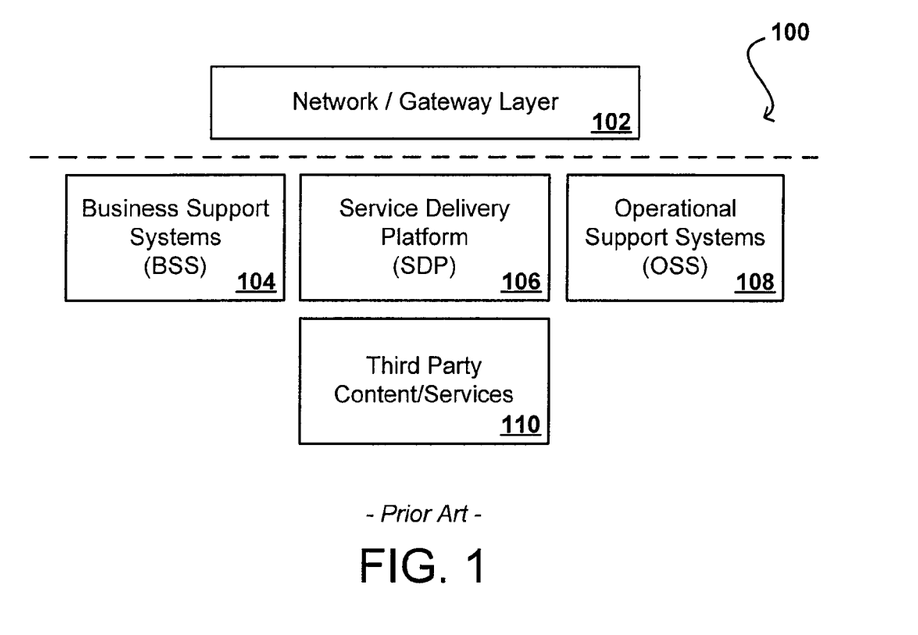
FIG. 1 illustrates a service provider architecture of the prior art.

For example, a telecommunications service provider typically maintains a large set of different repositories that each contain certain information about customers of that provider. FIG. 1 illustrates an example of an architecture 100 for such a provider. It can be seen that a number of systems and components reside behind the network and gateway layer 102, such as may include Business Support Systems (BSS) 104, a Service Delivery Platform (SDP) 106, Operational Support Systems (OSS) 108, and various other third party content and services 110. Each of these systems typically includes at least one repository containing a specific type of information, which generally is not substantially related or available to information in the repositories of the other systems.

For example, a BSS repository can store customer information from a service provider point of view, such as customer address information, customer billing information, products purchased by the customer, and campaigns to which a customer has responded. A BSS repository also can include subscription information for a customer, such as information for any voice, wireless, or roaming plan, as well as number of minutes purchased per month, etc. Such information is treated as product information from a BSS point of view, and the BSS repository also will include information as to whether a particular customer is subscribing to that product. If, for example, a customer subscribing to a new subscription is entitled to a new phone, that information typically will be maintained in the BSS repository. A BSS repository also typically is used to maintain trouble tickets, such as information regarding problems with service or failure to receive a form, as well as maintaining security credentials.

An OSS repository, on the other hand, is used for monitoring and administration of the system or other OSS operations such as charging/rating and activation provisioning. An OSS repository can also contain subscriber information such as information for the current and active bill for a customer, an inventory of assets associated with a customer, types of products or services provided to a customer, etc. A repository at the network level might include current network information for a customer, such as whether the customer is logged onto the network, a location of the customer on the network, whether a customer device is active, etc.

A service resource such as an SDP repository stores subscription information for a customer that is useful in running software services that are exposed to the customer, such as whether a particular customer has requested to receive news updates, and if so, also stores preference information such as which types of news the customer wishes to receive, e.g., international news or news related to a specific topic, as well as a channel in which to receive the news (e.g., SMS or MMS) and format information for the news (e.g., background color and font size). The SDP repository also can include information such as an identity for each customer, credentials, customer availability, etc.

There is other information that a telecommunications service provider may wish to combine with the SDP information. For example, a provider typically has to manage runtime information, such as presence and location information for a user on the network or other details related to the network activities, connectivity, etc. In addition to the context of a well factored-out service layer, the provider also manages dynamic information coming from the network, such as IMS Home Subscriber Service (IMS HSS) and Home Location Register (HLR) information. It can be desirable for all this information to be available to various services and applications.

Certain information overlaps or is related to other information stored for different services or in different repositories. Unfortunately, it is not practical for most entities to rewrite the schemas or redesign all the systems and services to use a common data model, single repository, single point of access, etc. As such, there typically is no way to treat the various repositories as a single data source that is readily available to applications, users, etc.

Figure 2:
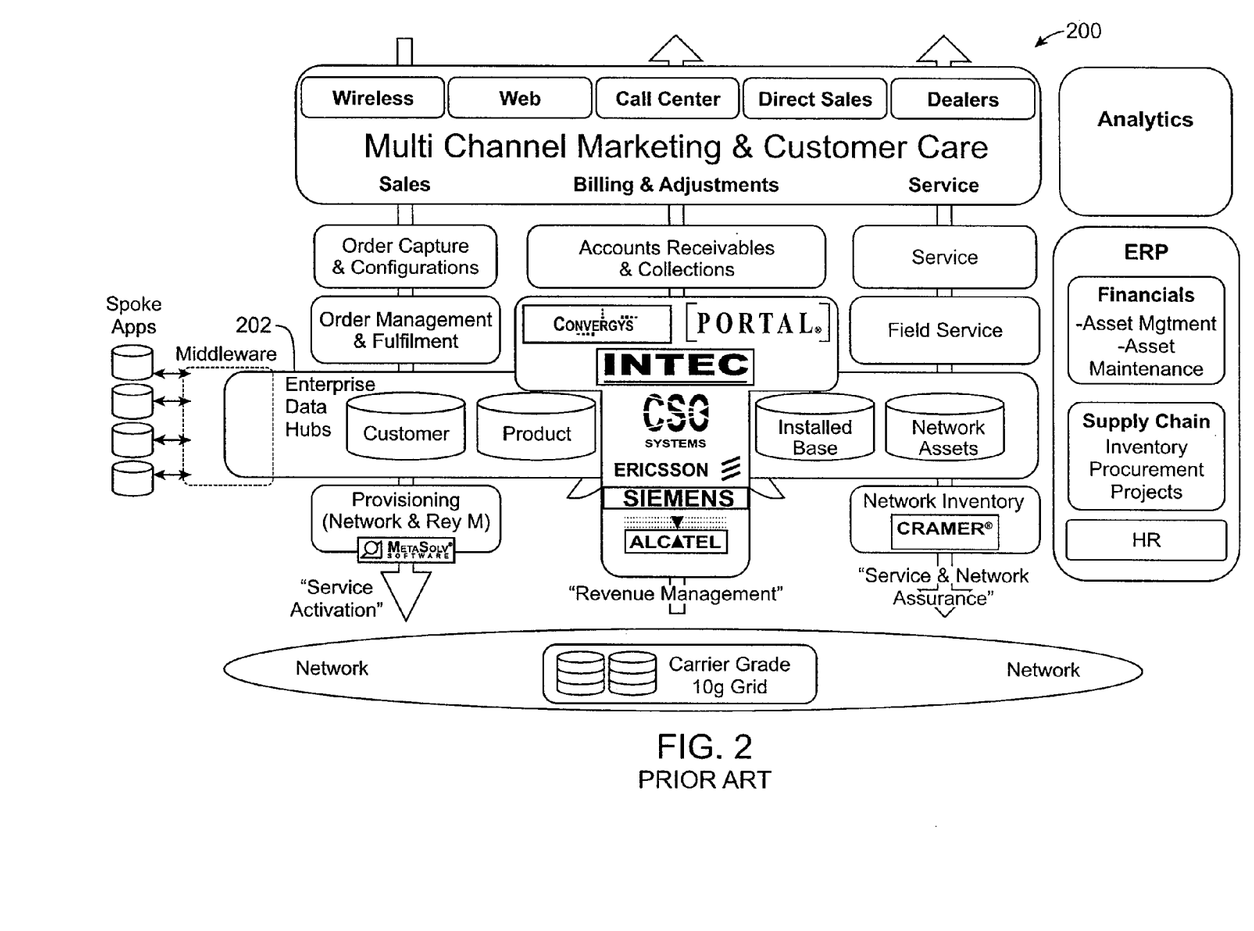
FIG. 2 illustrates a data-hub based architecture of the prior art.

Certain approaches utilize a common database for all information related to principals such as subscribers. An exemplary architecture 200 for such an approach is shown in FIG. 2. In this example, data hubs 202 are used that are based on a common model, such as a customer data model or TMF (Telemanagement Forum) Shared Information/Data (SID) model. A problem with such an approach is that the common data model does not allow a system such as a BSS system to share data with the execution environment, which can include Home Subscriber Server (HSS) information, service specific data, presence information, etc., as the data is still maintained in silos at that level.

Further, a model such as that shown in FIG. 2 does not provide for identity management across the various systems (i.e., the possibility to associate credential, single sign-on, map/associate multiple identities to a same principal, anonymize some identities or federate the identities and repositories across multiple service providers/actors), and does not provide the tools needed to manage the identity of customers across the network, such as when a customer accesses a new service on the network or accesses the network using a new device. Further, functionality such as single sign-on and identity federation is not provided at the level of the customer data hub(s).

BRIEF SUMMARY OF THE INVENTION

Systems and methods in accordance with various embodiments of the present invention can overcome these and other deficiencies in existing systems by providing a common view and access point for multiple disparate data sources and systems across different data domains. Various tools provide for the mapping and management of identity across the domains, allowing for use of a single identities.

In one example, a common view of customer data is provided across data domains including a BSS data source, an OSS data source, a service layer or service delivery platform data source, a runtime data source, and a network data source. The data in the different domains can be stored according to different schemas and using different identifiers for the customer. A unified user profile is created that maps the identities of the customer across the various data domains to a single identity. A virtual directory is provided using the unified user profile that allows customer data from each of the data domains to be viewed and accessed by a user or application as if all the customer data is stored in a single repository and uses a single customer identifier. A user, service, application, or other entity or component is able to thus access the customer information in the data repositories through a single interface to the virtual directory.

Various tools provide for the management of identity across the various data sources and systems, allowing for such functionality as single sign-on and federated identities. A common access point thus allows for sharing of BSS, OSS, billing, and subscription information, along with other dynamic, runtime, service, and network information across different access networks, and allows different access channels to access the same services using the same settings, and sharing information already stored for the customer on the network. The common access point and managed identity also allows a user or application to concurrently update information related to a customer across the various domains, regardless of the where the data is stored.

A further understanding of the nature and the advantages of the inventions disclosed herein may be realized by reference of the remaining portions of the specification and the attached drawings.

BRIEF DESCRIPTION OF THE DRAWINGS

Various embodiments in accordance with the present invention will be described with reference to the drawings, in which.

DETAILED DESCRIPTION OF THE INVENTION

Systems and methods in accordance with various embodiments can overcome the aforementioned and other deficiencies in existing systems by providing a common view and access point for multiple disparate data sources and systems.

Further, various tools provide for the management of identity across the various data sources and systems, allowing for such functionality as single sign-on and federated identities. For a telecommunications service provider, for example, a unified user profile (UUP) and common access point provides for sharing of BSS, OSS, billing, and subscription information, along with dynamic information (e.g., presence and location information) and service and network location information (e.g., HSS), across different access networks, and allows different access channels (e.g., broadband, cable, or wireless) to access the same services using the same settings, and sharing information already stored for the customer on the network.

A system in accordance with one embodiment provides a unified user profile and common access point that allows any system behind the network gateway to be accessed as a single source of information. At least one interface (e.g., an API) is provided that allows a user to access any information related to a given customer using the federated customer identity through a single access point. The access point and managed identity also allows a user or application to concurrently update information related to a customer across the various systems, regardless of the system(s) containing the information being updated.

One way in which this is achieved is through the use of a virtual directory, which provides the ability to view all the data across the domain. In one embodiment, a single API is used to provide access to multiple databases as if those databases were part of a common data source, and allows the information to be viewed as it the information was part of a single "virtual" directory. In creating the API, information from the various repositories can be aggregated with information coming from the service delivery platform. As illustrated in the exemplary architecture 300 of FIG. 3, a user request coming through the network and gateway layer should be able to interact with the service delivery platform 304, as well as systems and services such as BSS 306, OSS 308, and third party content and services 310. An identity management module or service 312 can be used to manage the unified user profile 314, as well as provide the vitural directory service 316 and provide for single sign-on service 318. In this case, the data from the BSS 306 and OSS 308 can be combined with data from the network layer 302, such as Home Location Register (HLR) or Home Subscriber Server (HSS) information, and aggregated with data from the service delivery platform 304, which can include information such as presence or location information for a customer.

Figure 3:
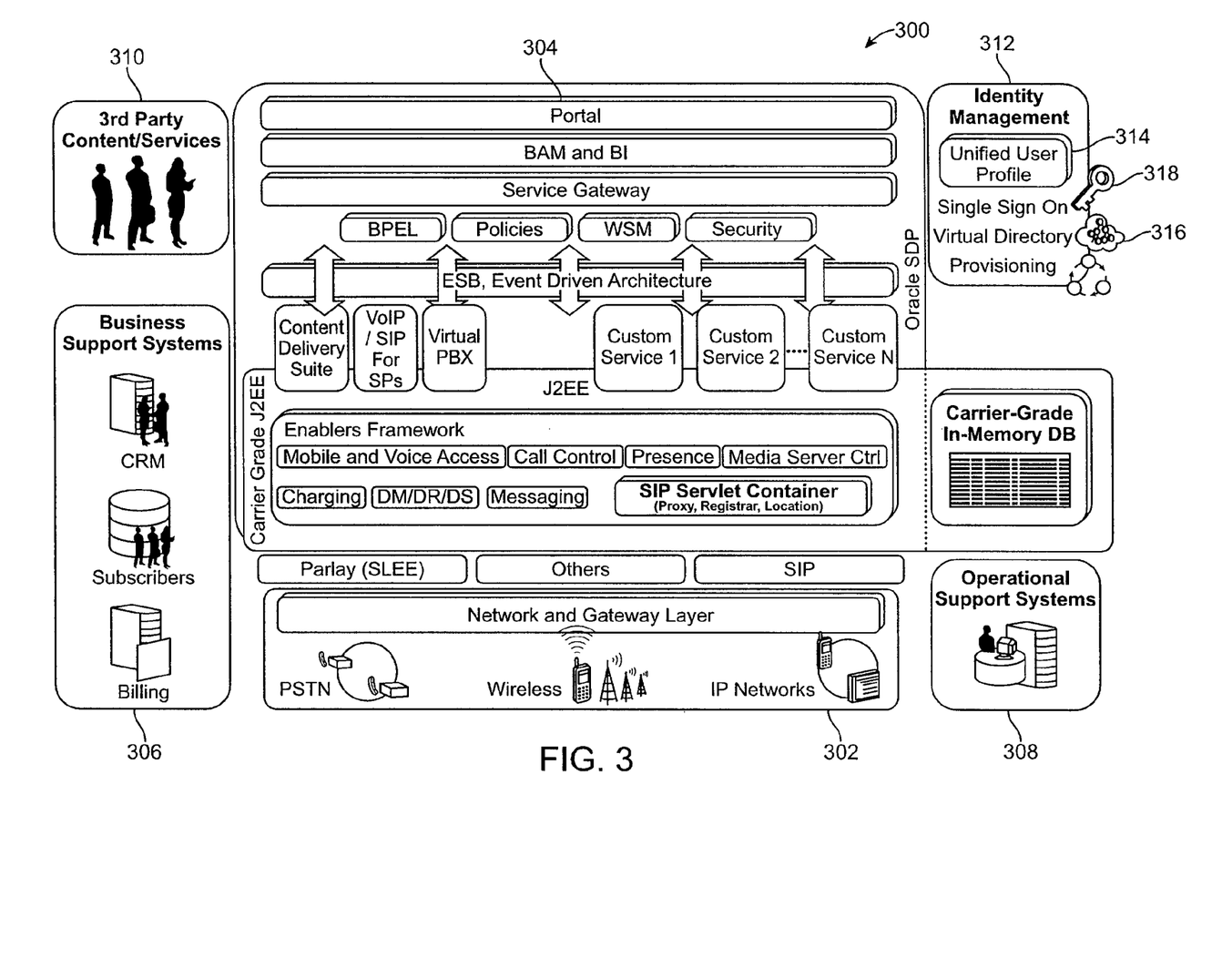
FIG. 3 illustrates an architecture utilizing an identity management tool that can be used in accordance with one embodiment of the present invention.

It is likely that the identities used for each of the repositories will be different, even for a common customer (e.g., when coming from different access network or when considered in different domain (OSS, BSS and run time)). The identity management tool 312 is able to federate the identities across the various repositories, identifying identifiers for a single user and mapping those identities to a unified identifier that allows a user or application to access any of the data in any of the repositories using just the unified identifier, as the identity management tool 312 then can determine the appropriate identifier(s) to use for the necessary system(s). The identity management tool also can pull information for the customer from the various repositories using the unified profile information, and can present that information to the user or application in a virtual directory wherein the data appears to come from a single source.

In one example, identities are mapped to a single principal identity, and items from different repositories are mapped together using various tools or predefined schema mappings. Using the mappings, input from the different databases are aggregated and presented in an aggregated manner that in self can be managed with the single principal identity.

A UUP can include a service resource such as an enabler that provides an identity managed virtual view of all the data about principals encountered in the SDP, including information such as credentials, subscriptions, service-specific data, network data (e.g., HSS), dynamic data (e.g., presence and location information), and profile information. The UUP provides for customizable schema mapping and caching or pre-fetching of data. The UUP also allows northbound interfaces to be wrapped and/or transformed as needed. These northbound interfaces can include, for example, interfaces such as Java (e.g., JNDI, JAX RPC, JAX WS), SOAP/HTTP (e.g., Rg Interface), LDAP, Diameter (e.g., Sh/Dh, Cx/Dx), OMA GSSM, and XCAP (e.g., OMA XDM profile enabler) interfaces. The UUP also can support "southbound" protocols including LDAP, XCAP, JDBC, Custom/Web service, and Diameter (e.g., Sh/Dh, Cx/Dx, HSS, SLS) protocols. The UUP can support various IMS profiles, customer data models, subscriber management features including integration with OSS/BSS, and various administration features.

A UUP also can be used to provide identity management across multiple domains including OSS, BSS, SDP or service layer, and network domains. For a service layer, the UUP can provide for the user of single sign-on features and partnership with third party providers. Identity management and federation are essential across service layer and access networks to enable consistent customer identification across access networks. Identity management shared with OSS/BSS is essential to allow shared OSS/BSS across access networks (e.g. common CRM or Subscription management).

The integration can also take advantage of a virtual directory that provides a virtually consolidated LDAP view of heterogeneous identity sources without requiring any synchronization. The virtual directory can connect OTB with LDAP and databases, and can provide a custom adapter that can support connections to any resource, such as Web services, to which Java can connect. A virtual directory also can provide various northbound (e.g., LDAP and DSML) and southbound (e.g., LDAP, database, custom) interfaces, as well as a join view that can combine data from multiple sources into a single virtual "super" entry.

In the example of FIG. 3, the service delivery platform (SDP) includes a horizontal, standards-based platform that abstracts the underlying network resources and follows a service-oriented architecture (SOA). Further information about such a service delivery platform is detailed in co-pending U.S. patent application Ser. No. 11/357,653, filed Feb. 16, 2006, entitled "FACTORIZATION OF CONCERNS TO BUILD A SDP (SERVICE DELIVERY PLATFORM)," which is hereby incorporated herein by reference. In one embodiment, the SDP utilizes a horizontal SOA platform based on the Java 2 Platform, Enterprise Edition (J2EE). The SDP includes a converged container based on Java Specification Requests JSR 116/289 and JSR 32, which includes SOA SIP AS, OSA AS, and telephony AS as a J2EE converged container. The SDP also exposes mobile, voice, and other communications enablers.

A service delivery platform such as is illustrated in FIG. 3 can build upon a standards based IT platform, such as an underlying J2EE core, and can make the platform carrier grade. The SDP can extend support beyond IP HTTP to support key protocols for telecommunications, for example, such as SIP/ISC, Diameter, and Parlay CORBA, for example, as well as adapters to messaging gateways. A standard or generic approach can be used to build adapters to any other resource or protocol using JCA 1.5. An SDP also can provide enablers as reusable components that abstract network resources and northbound interfaces. Services such as revenue services can be provided via IT and/or SOA functionality. The SDP also can provide support for SOA-based policies and business rules, as well as SOA-based integration of domains such as OSS domains with the SDP domain.

The SDP can include a number of enablers that can be implemented on, for example, SIP and Parlay. A presence enabler can be provided that follows OMA SIP/SIMPLE Presence, XDM, and RLS enabler specifications, which can aggregate presence from other networks and provide a northbound Parlay X interface for applications to use presence without participating in the presence network. Location data can be modeled as a presence attribute in one approach using an extensible presence data model. A multi-channel application-to-person (A2P) and person-to-application (P2A) messaging enabler can be sued that allows for sending and receiving of messages in channels like SMS, MMS, email, IM (XMPP), SIP, and others. A service level charging enabler can expose online, offline charging balance inquiry and tracking, pre-rated charging, etc., integrated to Ro/Rf (AAA media gateways), Parlay and Oracle BRM. A media server control enabler and voice access enabler can be used to control a wide variety of voiceXML servers, IVRs, announcement servers, and media servers (e.g. MSML, MSCML, MSCP, MGCP, . . . ). Protocols not available out of the box can be built on SIP AS or using JCA 1.5, for example.

Figure 4:
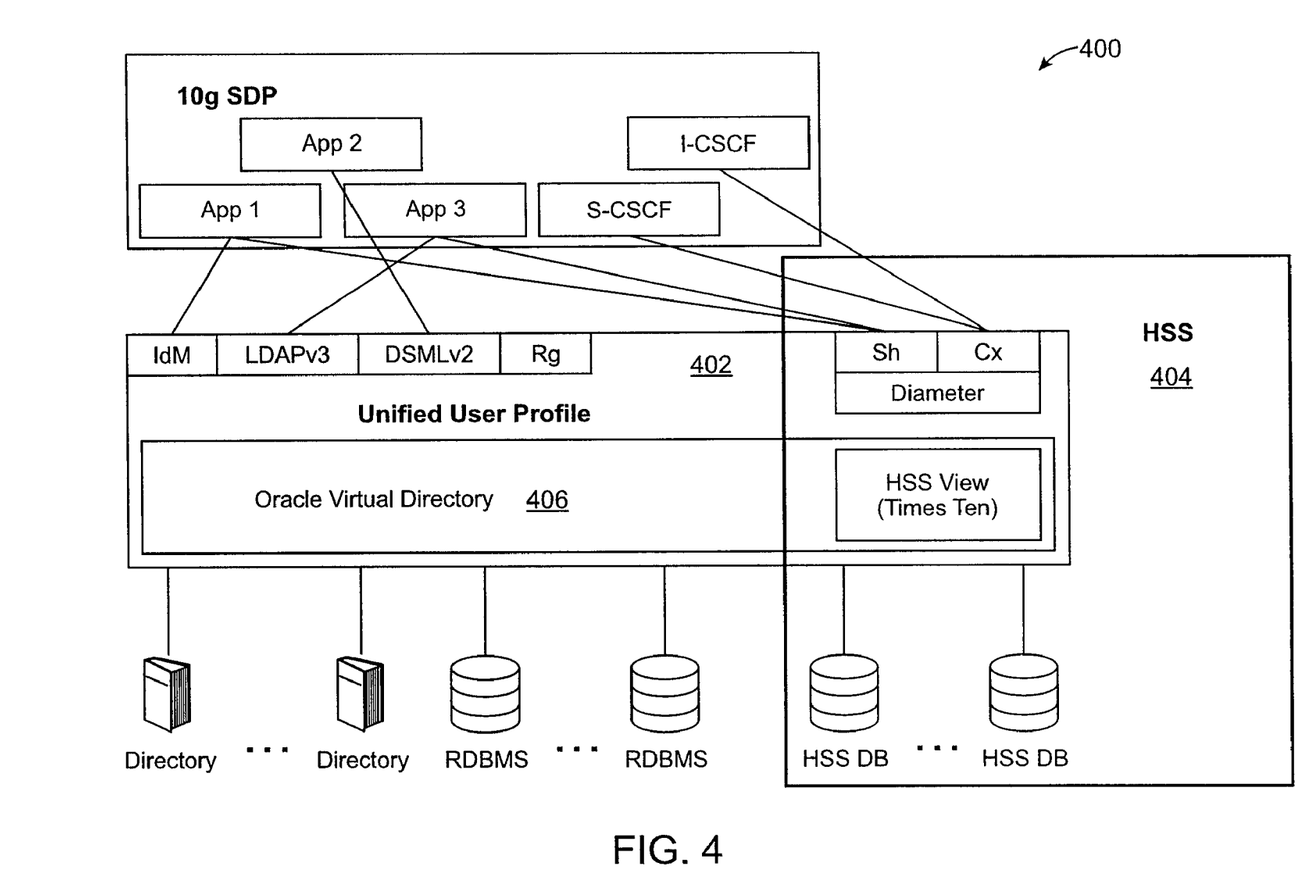
FIG. 4 illustrates an architecture providing communication with a virtual directory via a unified user profile in accordance with one embodiment of the present invention.

FIG. 4 illustrates a first implementation 400 of a unified user profile (UUP) 402, wherein the UUP provides various applications in the SDP with concurrent network access to various directories and repositories/database management systems across the domain. Concurrent access can be provided via various methods, such as by using Identity Management (IdM), Lightweight Directory Access Protocol (LDAP v3), Directory Services Markup Language (DSML v2), and Diameter Sh and Cx. The UUP can include a highly extensible user profile with support for application-specific dynamic user views, and can provide support for Home Subscriber Server (HSS) and Subscription Location Function (SLF) functionality, as the views of the HSS or SLF (e.g., HLR) can be aggregated. If the northbound interface includes Diameter, for example, then it can behave similar to an HSS, and can extend the nature of the data provided. It can be advantageous to extend traditional network, OSS, or BSS data repositories by behaving similar to those repositories, but providing extensions via other data sources, using the same or an extended schema but the same interface, API, reference point, or protocol as the northbound interface that is exposed to others for accessing or interacting therewith. The user profile data can be managed using any appropriate data management system, such as the Oracle RDBMS server available from Oracle Corporation of Redwood Shores, Calif.

The UUP 402 also can be unified with a customer data hub in order to provide for all service-specific data, not just BSS information but also information such as privacy and preference information. The UUP also can overlap with dynamic data provided by Home Subscriber Server (HSS) 404 and Subscription Location Function (SLF) services, which can provide information such as presence and location information, along with a function such as HLR. By providing a common access point, the virtual directory provided by the UUP tool can also provide access to information such as account and billing information, subscription information, provisioning settings, and identity authorization and security information, for example. Identity management provided for the data hub through the UUP can include functionality such as single sign-on, identity federation, and anonymization.

The authorization enabler and BSS can be used to provide for charging, messaging, and other functionality of an enabler framework via the identity management tool.

An advantage to such an approach is that the common view is not done from a static schema or data aggregation point of view. While schemas can certainly be combined and used with various embodiments, there is no need to combine schemas or aggregate data into a single data repository. Embodiments are able to combine views of the various data sources into a common view via the virtual directory, effectively combining information for a user from the various sources across the BSS and runtime of the network without the need to change any schemas or existing data models. The schemas can all be different, but the common view and identity management can hide these differences. For example, it is possible that all the data is simply lumped together. It then is also possible to use tools such as those provided by OVD to do a mapping in advance of fields that can be combined, cleaned using policies or scripts, or other such functions. This can be done in real time.

Such an approach also allows for a common view of types of data that typically are not combined in a traditional system. When aggregating data, systems typically combine data of similar types, such as BSS data from multiple BSS repositories (or OSS repositories). Other systems combine data from multiple sources to build a new data source. Embodiments described and suggested herein avoid the expense and work needed for such approaches by instead utilizing adapters built into sources of data that have not previously been combined, such as authorization data with presence data in such a system. Presence data, for example, is dynamically updated into a presence server, and is not related with authorization tables that an application is building, or related to billing or subscription information maintained by the BSS system. As such, this data would not have been combined using previous approaches. Embodiments herein, however, allow can provide a common view of data coming from completely different domains without altering anything about those domains, effectively combining data that would not have been considered to be common or related data before. Further, embodiments combine the customer data with information such as network state, location preference, and service preference, which was not previously provided in such systems.

Figure 5:
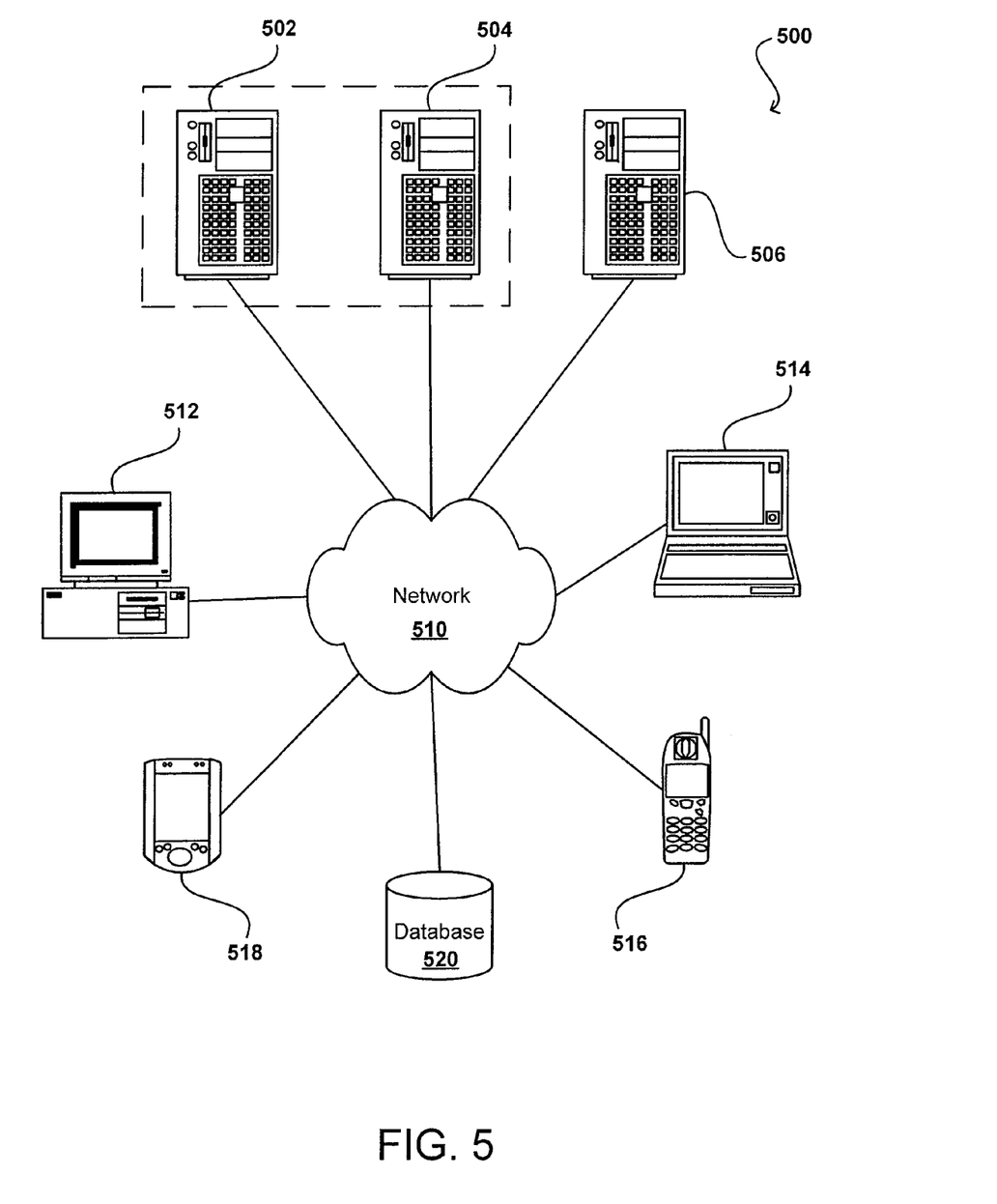
FIG. 5 illustrates components of a computer network that can be used in accordance with one embodiment of the present invention.

FIG. 5 is a block diagram illustrating components of an exemplary operating environment in which various embodiments of the present invention may be implemented. The system 500 can include one or more user computers, computing devices, or processing devices 512, 514, 516, 518, which can be used to operate a client, such as a dedicated application, web browser, etc. The user computers 512, 514, 516, 518 can be general purpose personal computers (including, merely by way of example, personal computers and/or laptop computers running a standard operating system), cell phones or PDAs (running mobile software and being Internet, e-mail, SMS, Blackberry, or other communication protocol enabled), and/or workstation computers running any of a variety of commercially-available UNIX or UNIX-like operating systems (including without limitation, the variety of GNU/Linux operating systems). These user computers 512, 514, 516, 518 may also have any of a variety of applications, including one or more development systems, database client and/or server applications, and Web browser applications. Alternatively, the user computers 512, 514, 516, 518 may be any other electronic device, such as a thin-client computer, Internet-enabled gaming system, and/or personal messaging device, capable of communicating via a network (e.g., the network 510 described below) and/or displaying and navigating Web pages or other types of electronic documents. Although the exemplary system 500 is shown with four user computers, any number of user computers may be supported.

In most embodiments, the system 500 includes some type of network 510. The network may can be any type of network familiar to those skilled in the art that can support data communications using any of a variety of commercially-available protocols, including without limitation TCP/IP, SNA, IPX, AppleTalk, and the like. Merely by way of example, the network 510 can be a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, GRPS, GSM, UMTS, EDGE, 2G, 2.5G, 3G, 4G, Wimax, WiFi, CDMA 2000, WCDMA, the Bluetooth protocol known in the art, and/or any other wireless protocol); and/or any combination of these and/or other networks.

The system may also include one or more server computers 502, 504, 506 which can be general purpose computers, specialized server computers (including, merely by way of example, PC servers, UNIX servers, mid-range servers, mainframe computers rack-mounted servers, etc.), server farms, server clusters, or any other appropriate arrangement and/or combination. One or more of the servers (e.g., 506) may be dedicated to running applications, such as a business application, a Web server, application server, etc. Such servers may be used to process requests from user computers 512, 514, 516, 518. The applications can also include any number of applications for controlling access to resources of the servers 502, 504, 506.

The Web server can be running an operating system including any of those discussed above, as well as any commercially-available server operating systems. The Web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 512, 514, 516, 518. As one example, a server may execute one or more Web applications. The Web application may be implemented as one or more scripts or programs written in any programming language, such as Java®, C, C# or C++, and/or any scripting language, such as Perl, Python, or TCL, as well as combinations of any programming/scripting languages. The server(s) may also include database servers, including without limitation those commercially available from Oracle®, Microsoft®, Sybase®, IBM® and the like, which can process requests from database clients running on a user computer 512, 514, 516, 518.

The system 500 may also include one or more databases 520. The database(s) 520 may reside in a variety of locations. By way of example, a database 520 may reside on a storage medium local to (and/or resident in) one or more of the computers 502, 504, 506, 512, 514, 516, 518. Alternatively, it may be remote from any or all of the computers 502, 504, 506, 512, 514, 516, 518, and/or in communication (e.g., via the network 510) with one or more of these. In a particular set of embodiments, the database 520 may reside in a storage-area network ("SAN") familiar to those skilled in the art. Similarly, any necessary files for performing the functions attributed to the computers 502, 504, 506, 512, 514, 516, 518 may be stored locally on the respective computer and/or remotely, as appropriate. In one set of embodiments, the database 520 may be a relational database, such as Oracle 10g, that is adapted to store, update, and retrieve data in response to SQL-formatted commands.

Figure 6:
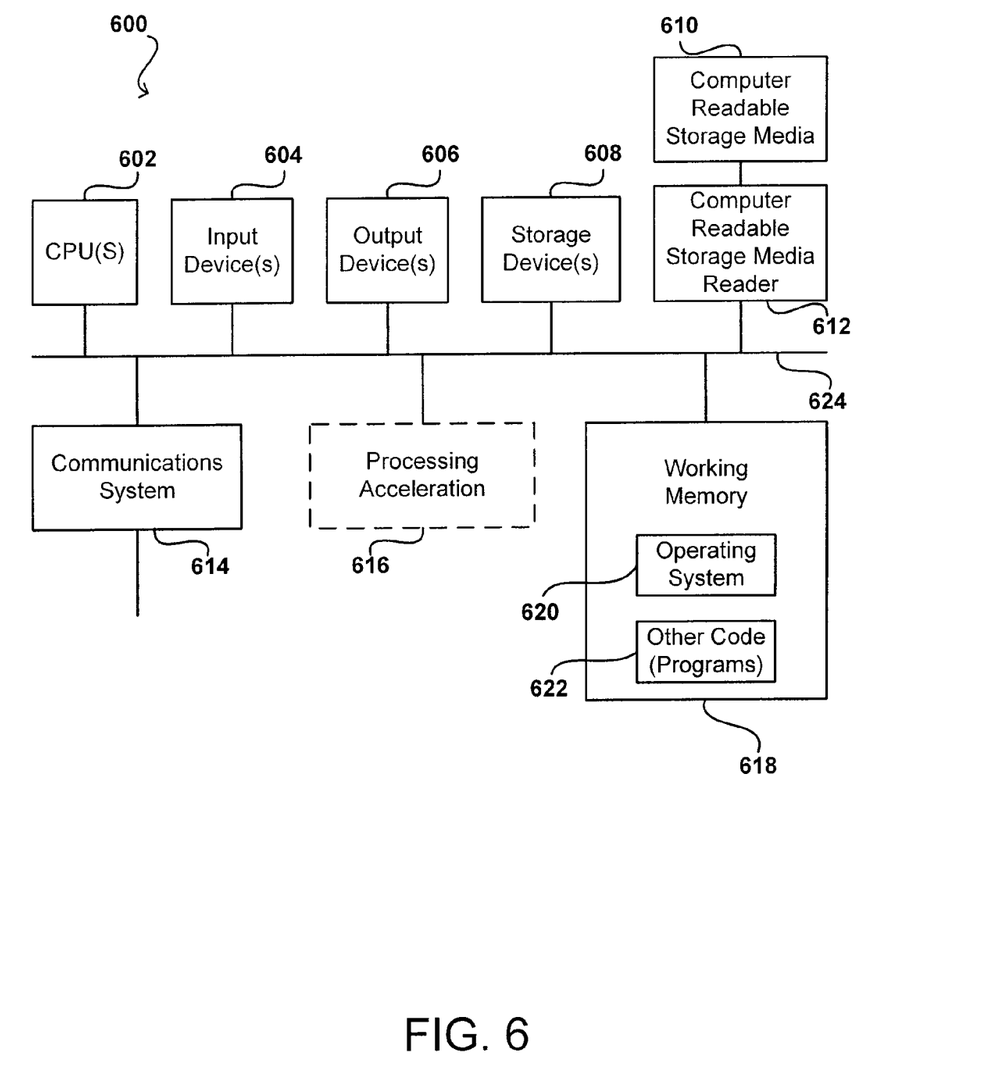
FIG. 6 illustrates components of a computerized device that can be used in accordance with one embodiment of the present invention.

FIG. 6 illustrates an exemplary computer system 600, in which various embodiments of the present invention may be implemented. The system 600 may be used to implement any of the computer systems described above. The computer system 600 is shown comprising hardware elements that may be electrically coupled via a bus 624. The hardware elements may include one or more central processing units (CPUs) 602, one or more input devices 604 (e.g., a mouse, a keyboard, etc.), and one or more output devices 606 (e.g., a display device, a printer, etc.). The computer system 600 may also include one or more storage devices 608. By way of example, the storage device(s) 608 can include devices such as disk drives, optical storage devices, solid-state storage device such as a random access memory ("RAM") and/or a read-only memory ("ROM"), which can be programmable, flash-updateable and/or the like.

The computer system 600 may additionally include a computer-readable storage media reader 612, a communications system 614 (e.g., a modem, a network card (wireless or wired), an infra-red communication device, etc.), and working memory 618, which may include RAM and ROM devices as described above. In some embodiments, the computer system 600 may also include a processing acceleration unit 616, which can include a digital signal processor DSP, a special-purpose processor, and/or the like.

The computer-readable storage media reader 612 can further be connected to a computer-readable storage medium 610, together (and, optionally, in combination with storage device(s) 608) comprehensively representing remote, local, fixed, and/or removable storage devices plus storage media for temporarily and/or more permanently containing, storing, transmitting, and retrieving computer-readable information. The communications system 614 may permit data to be exchanged with the network and/or any other computer described above with respect to the system 600.

The computer system 600 may also comprise software elements, shown as being currently located within a working memory 618, including an operating system 620 and/or other code 622, such as an application program (which may be a client application, Web browser, mid-tier application, RDBMS, etc.). It should be appreciated that alternate embodiments of a computer system 600 may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by the computer. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A system for providing a common view of customer data across multiple data domains, the system comprising a processor and a memory coupled with and readable by the processor and having stored therein instructions which, when executed by the processor, cause the processor to implement:
a plurality of data repositories operable to store customer information related to a customer, at least two of the repositories storing a portion of the customer information in different data domains according to different schemas and including different identities for the customer, wherein the repositories of each domain are accessed using the identity for the customer for the domain, and wherein the plurality of data repositories include data repositories for a business support system (BSS), an operational support system (OSS), a service layer, a runtime component, and a network component;
at least one network access component providing access to the plurality of data repositories;
an identity management tool maintaining a unified user profile for the customer, the unified user profile including a predefined schema mapping of each data repository to an aggregated view of the customer information including one of the customer identities and a mapping of each of the customer identities to a single customer identity whereby each of the data repositories is accessed through the identity management tool using the single customer identity for the unified user profile, the identity management tool further including at least one adapter operable to provide access to customer information in the data repositories through a single interface, the interface including a virtual directory of the customer information and providing the aggregated view of the customer information from the different domains based on the predefined schema mappings whereby the customer information from the data repositories appears to come from a single data source; and
a management tool operable to aggregate data in the virtual directory, wherein the unified user profile and virtual directory effectively extend the data repositories of different domains by utilizing at least one additional data source using a common schema or an extended schema, along with a common interface or reference point for accessing each data repository, and wherein the virtual directory provides a common view of data from each of the data repositories.

2. A system according to claim 1, wherein:
the virtual directory provides a common view that further includes at least one of service-specific data, network data, and credential data.

3. A system according to claim 1, further comprising:
additional adapters providing access to the plurality of data repositories.

4. A system according to claim 1, wherein:
the identity management tool provides a common view of the customer information through the virtual directory for multiple access networks and access channels.

5. A system according to claim 1, wherein:
the identity management tool provides for a aggregation of billing, subscription, service, and customer information across a domain.

6. A system according to claim 1, wherein:
the BSS includes a charging enabler operable to charge against a billing system and a rating system using identifiers managed by the unified user profile.

7. A system according to claim 1, wherein:
the multiple data domains include an OSS domain, a BSS domain, a network domain, and a service layer domain.

8. A system according to claim 7, wherein:
the service layer domain includes a service delivery platform.

9. A system according to claim 1, wherein the virtual directory is operable to provide pre-mapping of the customer data.

10. A system according to claim 1, wherein the virtual directory is operable to apply at least one of policies and scripts to the customer data.

11. A system according to claim 1, further comprising:
an application operable to access the customer data from any of the multiple data domains through the virtual directory.

12. A method for providing a common view of customer data across multiple data domains, comprising:
storing customer information related to a customer in a plurality of data repositories, at least two of the repositories storing a portion of the customer information in different data domains according to different schemas and including different identities for the customer, wherein the repositories of each domain are accessed using the identity for the customer for the domain, and wherein the plurality of data repositories include data repositories for a business support system (BSS), an operational support system (OSS), a service layer, a runtime component, and a network component;
mapping the schema of each data repository to an aggregated view of the customer information using a unified user profile;
mapping the different identities for the customer to a single customer identity using the unified user profile such that each of the data repositories is accessed using the single customer identity for the unified user profile;
in response to a request for customer information, providing access to the customer information in the data repositories through a single interface, the interface including a virtual directory of the customer information providing the aggregated view of the customer information from the different domains based on the mapping of the schema of each data repository to the aggregated view and including one of the customer identities mapped to the single customer identity such that the customer information from the data repositories appears to come from a single data source, wherein the unified user profile and virtual directory effectively extend the data repositories of different domains by utilizing at least one additional data source using a common schema or an extended schema, along with a common interface or reference point for accessing each data repository, and wherein the virtual directory provides a common view of data from each of the data repositories; and
generating a single response including all the customer information from each of the data repositories that corresponds to the request.

13. A method according to claim 12, further comprising:
storing subscription information for the customer and providing services to which the customer has subscribed.

14. A method according to claim 12, further comprising:
pre-mapping the customer data in the virtual directory.

15. A method according to claim 12, further comprising:
applying at least one of policies and scripts to the customer data in the multiple data domains via the virtual directory.

16. A computer program product embedded in a computer readable storage device and including instructions that, when executed by a processor cause the processor to provide a common view of customer data across multiple data domains, comprising:
program code for storing customer information related to a customer in a plurality of data repositories, at least two of the repositories storing a portion of the customer information in different data domains according to different schemas and including different identities for the customer, wherein the repositories of each domain are accessed using the identity for the customer for the domain, and wherein the plurality of data repositories include data repositories for a business support system (BSS), an operational support system (OSS), a service layer, a runtime component, and a network component;
program code for mapping the schema of each data repository to an aggregated view of the customer information using a unified user profile and mapping the different identities for the customer to a single customer identity using the unified user profile such that each of the data repositories is accessed using the single customer identity for the unified user profile;
program code for providing access to the customer information in the data repositories through a single interface using a single customer identity for the unified user profile in response to a request for customer information, the interface including a virtual directory of the customer information providing the aggregated view of the customer information from the different domains based on the mapping of the schema of each data repository to the aggregated view and including one of the customer identities mapped to the single customer identity such that the customer information from the data repositories appears to come from a single data source, wherein the unified user profile and virtual directory effectively extend the data repositories of different domains by utilizing at least one additional data source using a common schema or an extended schema, along with a common interface or reference point for accessing each data repository, and wherein the virtual directory provides a common view of data from each of the data repositories; and
program code for generating a single response including all the customer information from each of the data repositories that corresponds to the request.

17. A computer program product according to claim 16, further comprising:
program code for storing subscription information for the customer and providing services to which the customer has subscribed.

18. A computer program product according to claim 16, further comprising:
program code for pre-mapping the customer data in the virtual directory.

19. A computer program product according to claim 16, further comprising:
program code for applying at least one of policies and scripts to the customer data in the multiple data domains via the virtual directory.

* * * * *

UNITED STATES PATENT AND TRADEMARK OFFICE
CERTIFICATE OF CORRECTION

| | | |
|---|---|---|
| PATENT NO. | : 8,073,810 B2 | Page 1 of 1 |
| APPLICATION NO. | : 11/926738 | |
| DATED | : December 6, 2011 | |
| INVENTOR(S) | : Maes | |

It is certified that error appears in the above-identified patent and that said Letters Patent is hereby corrected as shown below:

On Title page 4, Item (56) in column 1, under "Other Publications", line 36, delete "19, 2009," and insert -- May 19, 2009, --, therefor.

In column 1, line 18, delete "an" and insert -- and --, therefor.

In column 4, line 39, delete "vitural" and insert -- virtual --, therefor.

Signed and Sealed this
Twenty-eighth Day of February, 2012

David J. Kappos
*Director of the United States Patent and Trademark Office*